(No Model.)

H. C. WIRT.
CEILING CLEAT.

No. 518,301. Patented Apr. 17, 1894.

WITNESSES

INVENTOR
Herbert C. Wirt, by
Bentley and Blodgett,
Attys.

UNITED STATES PATENT OFFICE.

HERBERT C. WIRT, OF BOSTON, MASSACHUSETTS, ASSIGNOR TO THE GENERAL ELECTRIC COMPANY, OF SAME PLACE.

CEILING-CLEAT.

SPECIFICATION forming part of Letters Patent No. 518,301, dated April 17, 1894.

Application filed October 27, 1893. Serial No. 489,257. (No model.)

*To all whom it may concern:*

Be it known that I, HERBERT C. WIRT, a citizen of the United States, residing at Boston, in the county of Essex and State of Massachusetts, have invented a certain new and useful Improvement in Ceiling-Cleats, of which the following is a specification.

My invention relates to ceiling cleats for incandescent lighting circuits, adapted to safely hold the two wires of such circuit in position; and has for its object to produce a cleat, the two parts of which may be made interchangeable, which may safely hold the wire in position, and is at the same time economically manufactured. To these ends I construct a cleat as shown in the accompanying drawings, which show an embodiment of my invention, and in which like letters denote like parts throughout, wherein—

Figure 1:
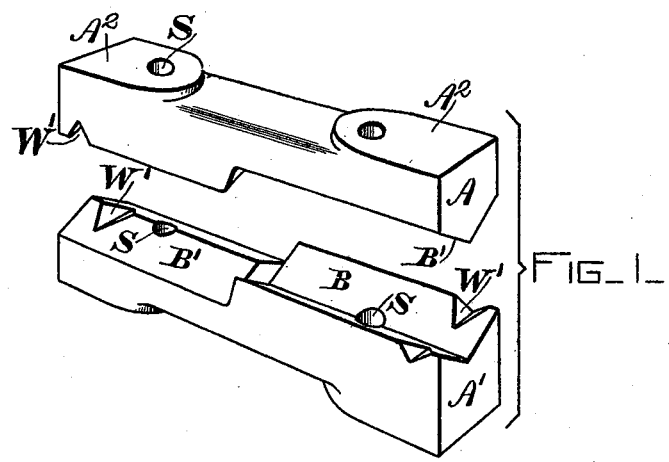
Figure 2:
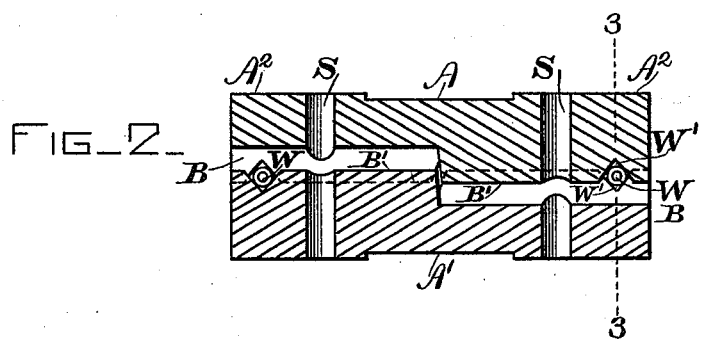
Figure 3:
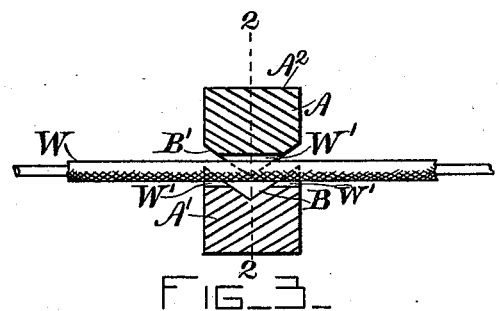

Figure 1 is a perspective view of my improved cleat showing both of its parts. Fig. 2 is a section upon the line 2—2 of Fig. 3 and Fig. 3 is a section upon the line 3—3 of Fig. 2.

A A' are the parts of my improved cleat, each of which is a counterpart of the other and either one may be used as the top block; $A^2$, $A^2$ are the bearing surfaces; B, B' are wedge shaped bearing surfaces serving to lock the cleat in position, each of which occupies one-half the internal surface of the block; B' being a convex bearing adapted to register with the concave bearing, B, upon the other block. The two parts of the cleat are provided with registering screw holes, S, S, and with cut-away portions, W', wherein the insulated wire, W, is laid.

The manner of affixing my cleat will be apparent from the preceding description.

Having thus described my invention, what I claim as new, and wish to secure by Letters Patent of the United States, is—

1. As a new article of manufacture, a block for a ceiling cleat having at one end a wedge-shaped convex bearing and at the other end a wedge-shaped concave bearing.

2. As a new article of manufacture, a block for a ceiling cleat having at one end a convex bearing and at the other end a concave bearing with a transverse wire groove in each bearing.

3. As a new article of manufacture, a block for a ceiling cleat having at one end a convex and at the other end a concave bearing with a transverse dove-tailed wire groove and a screw hole in each.

4. As a new article of manufacture, a ceiling cleat formed of two parts, as A, A', having bearing surfaces as $A^2$, and other wedge-shaped bearing surfaces, B, B', provided with cut-away portions, W', adapted to contain an insulated wire.

5. As a new article of manufacture, a block for a ceiling cleat comprising external bearing surfaces, as $A^2$, and internal wedge-shaped bearing surfaces, as B, B', each of such bearing surfaces occupying one-half the internal surface of the block and provided with cut-away portions, as W', adapted to contain an insulated wire.

In witness whereof I hereunto set my hand this 9th day of October, 1893.

HERBERT C. WIRT.

Witnesses:
A. M. CLURE,
H. J. LIVERMORE.